May 5, 1942.  J. W. UNDERWOOD  2,282,106
CERAMIC-TO-METAL SEAL
Filed July 14, 1939

Inventor:
James W. Underwood,
by Harry E. Dunham
His Attorney.

Patented May 5, 1942

2,282,106

UNITED STATES PATENT OFFICE 2,282,106

CERAMIC-TO-METAL SEAL

James W. Underwood, Pittsfield, Mass., assignor to General Electric Company, a corporation of New York Application July 14, 1939, Serial No. 284,481

6 Claims. (Cl. 113—112)

This invention relates to a ceramic-to-metal seal and to a method of making the same.

One object of the invention is to provide a strong, pressure-tight seal or joint between a metal body and a ceramic body capable of withstanding wide variations in temperature.

Another object of the invention is to provide in a metal-to-ceramic seal, a refractory metal coating which is firmly and intimately united with the porcelain body and which will not be alloyed away from the surface by solder.

Figure 1:
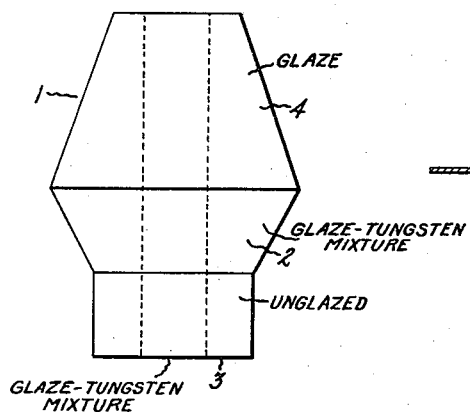
Figure 2:
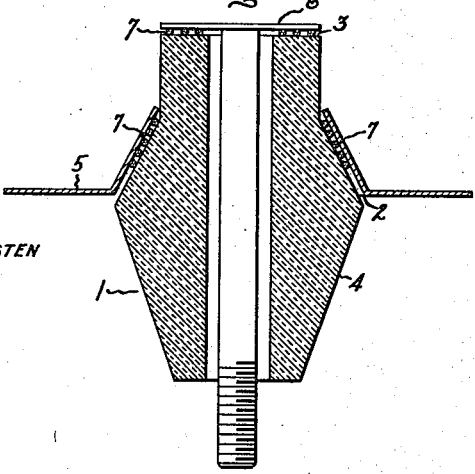
Figure 3:
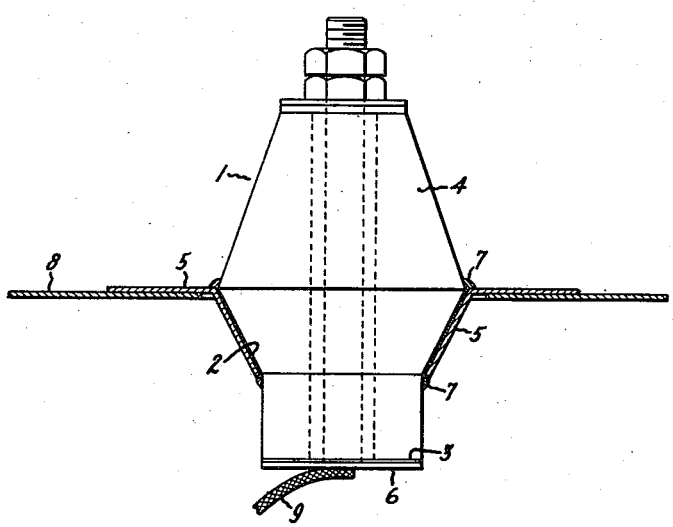

Further objects and features of the invention will become apparent from the following description taken in conjunction with the accompanying drawing in which Fig. 1 represents one application of the invention in the form of an ordinary porcelain capacitor bushing provided over a portion of its surface with the refractory metal coating; Fig. 2 is a sectional view of the coated bushing and metal collar before soldering; and Fig. 3 is a view, partially in cross-section, of the assembled bushing and collar joined by means of the improved metal-to-ceramic seal.

Ever since the art of decorating porcelain with metal was first discovered, various attempts have been made to solder or otherwise seal metal parts to metal coated ceramic or porcelain bodies. However, all of the methods have been characterized by certain disadvantages in that the metal coating was not firmly united with the porcelain body, or was alloyed away by solder which is applied thereto or the results were otherwise erratic and undependable. Such processes have included coating coating the ceramic body with a metal salt, such as platinum chloride, subsequently reduced to the free metal, firing onto the ceramic body a copper oxide coating which is then reduced by means of nascent hydrogen to metallic copper, and also deposition of a metal layer onto a roughened surface of a porcelain body by the Schoop process.

In a copending application of Hans Pulfrich, Serial No. 166,902, filed October 1, 1937, which has resulted in Patent No. 2,163,407, June 20, 1939, and assigned to the same assignee as the present invention, is disclosed a method of sealing a metal body to a ceramic body containing a eutectic solid solution having a fusion point lower than that of the ceramic body as a whole. The eutectic serves to secure a coating of tungsten or molybdenum applied directly to the ceramic body.

It has now been found that any ceramic or porcelain body, including the ordinary ceramics not containing a eutectic mixture having a melting point lower than that of the whole, may be provided with a refractory metal coating firmly adhering to the ceramic body by means of a glaze of such composition that it is not affected to any appreciable extent by high-temperature treatment in a reducing atmosphere. This metal-coated article may then be soldered to a metal surface with or without the preliminary application of a copper coating to the refractory metal coating.

To accomplish the purposes of this invention, the previously fired ceramic or porcelain body is painted at those parts to be metallized with a collodion-amyl acetate suspension of a mixture of a major portion of a powdered refractory metal, such as tungsten or molybdenum, and a minor portion of a suitable glaze having a softening point below that of the ceramic body. After allowing the coating to dry, the coated ceramic is fired in a reducing atmosphere, such as a hydrogen atmosphere, to fuse the glaze and produce a uniform closely adhering metallized surface composed of tungsten or molybdenum particles firmly embedded in, but not completely coated by, the glaze.

The ratio of refractory metal to the glaze is not critical. However, there should be sufficient glaze to bind the metal particles to the ceramic body and yet not enough to glaze over or completely cover or mask the metal particles. In other words, the ratio of metal powder to powdered glaze should be such that the firing of the coated ceramic produces a continuous metallic surface. It has been found that eight parts by weight of tungsten to one part by weight of glaze produces the desired metallic coating although this ratio is not critical and as little as three or four parts of tungsten to one part of glaze have been found to produce a satisfactory and economical metallized surface. Both the metal and the glaze should be used in a finely divided state; for instance, about 250 mesh.

When using molybdenum instead of tungsten, the weight ratio of metal powder to glaze can be much smaller. From two to four parts of molybdenum to one part of glaze is sufficient. A smaller amount of molybdenum as compared with tungsten can be employed because the success of the coating operation is primarily dependent upon the ratio between the number of particles of metal and the number of particles of glaze. As the specific gravity of tungsten is slightly less than twice that of molybdenum, only little more than half as much molybdenum need be used to obtain the same degree of metallization of the surface or, in other words, the same volume of metal per unit volume of glaze.

In an alternative method of coating the fired ceramic body, a dilute wash of the powdered glaze is brushed onto the ceramic body and allowed to dry after which a collodion-amyl acetate suspension of the metal powder is sprayed over the dried glaze. As the smallest amount of glaze capable of satisfactorily binding the metal particles to the ceramic body should be used, it is sometimes desirable to rub the dried glaze prior to the application of the metal suspension to leave only a very thin layer of glaze on the surface. After the suspension of metal powder has been applied and dried, the coated body is heated above the softening temperature of the glaze in a reducing atmosphere whereby the metal powder becomes firmly united with the underlying porcelain or ceramic material through the fusion of the glaze.

In either of the above methods, those surfaces of the ceramic body not covered by the metal coat may be coated prior to firing with a suitable glaze, preferably the same glaze used to bind the metal coat.

A glaze having the following composition has been found to possess a suitable softening or fusing point and will not blister when heated in a reducing atmosphere:

| | Parts by weight |
|---|---|
| Feldspar | 36.2 |
| Flint | 30.3 |
| Whiting | 15.0 |
| Florida clay | 13.0 |
| Chromium oxide | 5.5 |

The invention is not limited to a glaze of the exact composition set out above, but any glaze having a melting or softening point below that of the ceramic material and not containing any ingredient adversely affected by a reducing atmosphere at the firing temperature may be employed to unite the metal powder with the ceramic body. In this connection, it is desirable to avoid those glazes containing a substantial amount of metal oxides easily reduced by hydrogen since the steam produced by such reduction blisters the glaze and thus weakens the bond between the metal layer and the ceramic body.

It has been found that, of the available metals, tungsten, molybdenum, and except for the high cost, rhenium, produce satisfactory metallic surfaces when used in the above manner. Metals, such as iron, cobalt and nickel, are not desirable since their use necessitates rigorous control of the firing temperature to prevent actual reaction of the metal with the ceramic body or glaze to form a glaze which will not act as a satisfactory base for soldering or metal plating. Tungsten and molybdenum, on the other hand, do not tend to react with the glaze or ceramic body so that a satisfactory metal surface is easily produced.

Although a collodion-amyl acetate mixture has been suggested as the carrier for the metal powder or mixture of the metal powder and glaze, the practice of this invention is not limited thereto. Other carrying mediums which will volatilize during the firing operation without leaving any appreciable residue will be readily apparent to those skilled in the art. For example, other cellulose derivatives may be used with suitable solvent mediums therefor.

In general, the coated ceramic body is fired at a temperature above 1200° C. but below the softening point of the ceramic body. When the particular glaze previously described is employed, satisfactory results can be obtained by heating the coated body to a temperature of about 1275° C. for a period of two hours in an atmosphere of hydrogen. The time and temperature will vary, however, depending upon the size and shape of the ceramic body.

The metal coated ceramic body may be soldered to any metal part of suitable dimensions. The term "solder," as used throughout the specification and claims, is intended to cover both soft and hard solder and other brazing alloys. Hard solders are usually composed of silver or its alloys, such as a silver-nickel-copper alloy, and have melting points which in general are above 600° C. Such solders have the property of wetting the refractory metal layer. Soft solders, on the other hand, are usually low melting point alloys of lead, tin or other metals generally not capable of wetting the tungsten or molybdenum layer of the ceramic body described herein unless the layer is first electroplated or otherwise coated with a metal, such as copper, which the solder will wet.

When joining the metal part with the metallized ceramic body by means of hard soldering or brazing, the two parts may be brought into proper position with the solder placed between the metal body and the metallized layer which has been previously painted with a flux. The whole assembly then is heated in a hydrogen or other reducing atmosphere to the flow point of the particular solder. For ordinary silver alloy solder a temperature of 800° C. has been found sufficient. On cooling, a strong, pressure-tight seal results.

If the seal is to be made with soft solder, the metallized surface of the ceramic body is first plated with a thin coating of copper or other metal easily wet by soft solder. This preliminary step, which may be considered a part of the soft soldering operation as a whole, may comprise the electro-deposition of the copper from a copper cyanide plating solution. It is usually desirable that the copper plate should be relatively thin in order that it will have no tendency to peel away from the tungsten layer. After the plating operation is complete, the copper surface is buffed to remove any weak spots and produce a bright surface. The copper layer then may be tinned and the metal part, previously copper plated and tinned if necessary, jointed to the ceramic body by sweating the parts together in an air oven or by use of a soldering iron. While the hard soldering operations are best conducted in a reducing atmosphere, the low melting point soft solder permits heating in an air oven since no appreciable oxidation takes place at these lower temperatures.

The metal part or the surface thereof may be composed of any metal, such as iron or copper, which is wet by the particular solder employed. The strongest seal will result when a metal is employed having a coefficient of expansion the same as or close to that of the ceramic body over a wide temperature range. An iron-nickel alloy containing about 43 per cent nickel and traces of manganese and carbon has been found to be quite satisfactory for this purpose. When the coefficient of expansion of the metal differs from that of the ceramic body, it is usually desirable that the metal adjacent the seal be of rather thin cross-section. This is not requisite when the coefficients of expansion of the two bodies are of the same order.

In the accompanying drawing, the invention is shown in connection with the sealing of a porcelain bushing to a capacitor casing. The desired surface areas 2 and 3 of porcelain bushing 1 are provided with refractory metal coatings in the prescribed manner and any other desired surface portion, such as that indicated by numeral 4 is glazed in the usual manner. Preferably this glaze is of the same type as that binding the metal particles to the porcelain in order that it will not blister when fired in a reducing atmosphere. The metallized surfaces of bushing 1 are joined to a metal collar 5 and a metal stud 6 of suitable metals by interposing solder 7 shown in the form of wire between the metallized surface areas 2 and 3 of bushing 1 and the metal collar 5 and stud 6 in a manner such as that shown in Fig. 2. This assembly is then heated above the melting point of the solder to seal the metal parts to the porcelain bushing. The assembled bushing, collar and stud are shown in Fig. 3 with the metal collar 5 suitably soldered or otherwise sealed to capacitor casing 8 and the metal stud 6 connected with a flexible electrical conductor 9.

It is not necessary that the surface metallizing operation and the subsequent soldering operation be carried out as separate steps. For example, a single firing will be sufficient to produce the complete metal-to-ceramic seal if an unglazed, fired porcelain piece is first painted with the desired refractory metal-glaze mixture and is then placed in sealing position with respect to the metal part with a thin layer of some alloy or solder melting at approximately the glaze firing temperature interposed between the metal coated surface and the metal part. One suitable alloy for this purpose is that consisting of about 25 per cent nickel and 75 per cent copper and melting at about 1275° C. The assembled structure is placed in a hydrogen furnace and heated to a temperature of about 1275° C. for approximately two hours in order to metallize the surface of the ceramic body due to the fusing of the glaze and alloy or solder the metallized body to the metal part due to the melting of the nickel-copper alloy.

Metal-to-ceramic seals prepared by any of the above methods have been found to be exceptionally pressure-tight when tested over a range of temperatures. For example, a seal prepared in accordance with the first described method, that is, by the use of a collodion-amyl acetate suspension of approximately three parts tungsten to one part glaze fired at a temperature of above 1200° C. and sealed to the metal body by means of a hard solder did not fail when subjected to a pressure and temperature testing cycle involving the use of pressures of from 30 to 50 pounds per square inch and temperatures ranging from −40° C. to 140° C.

The metal-to-ceramic seals disclosed herein have many applications readily apparent to those skilled in the art other than the described fabrication of a capacitor bushing from metal and ceramic parts by the use of such seals. The seal is particularly useful in the manufacture of combination metal-ceramic bodies wherein a strong, pressure-tight joint is desired.

What I claim as new and desire to secure by Letters Patent of the United States is:

1. The method of forming a seal between a ceramic body and a metal body which comprises coating the ceramic body with a minor portion of a glaze, which is substantially unaffected by a reducing atmosphere and which consists, by weight, of about 36 parts feldspar, 30 parts flint, 15 parts whiting, 13 parts clay, and 5 parts chromium oxide, and a major portion of a refractory metal in powder form, heating the coated ceramic body in a reducing atmosphere to a temperature above the fusing point of said glaze to produce an integral tightly-adhering metal layer on the surface of said ceramic body, and soldering the metal-coated ceramic body to said metal body.

2. The method of joining a ceramic body to a metal body which comprises coating the surface of said ceramic body with a mixture of a finely divided refractory metal and a minor portion by weight of glaze consisting, by weight, of about 36 parts feldspar, 30 parts flint, 15 parts whiting, 13 parts clay, and 5 parts chromium oxide, bringing the coated ceramic body and the metal body into assembling position with a layer of hard, silver solder therebetween and firing the assembled structure in a reducing atmosphere at a temperature above the melting points of the glaze and the solder.

3. In combination, a ceramic body having a metallic coating on a portion of its surface, the said metal coating consisting of a fired mixture of a minor portion of glaze unaffected by a reducing atmosphere at higher temperatures and a major portion of finely-divided refractory metal, and a metal body joined to the metal coated portion of said ceramic body by means of solder, the said glaze having a softening point below that of the ceramic body and consisting essentially, by weight, of about 36 parts feldspar, 30 parts flint, 15 parts whiting, 13 parts clay, and 5 parts chromium oxide.

4. In combination, a ceramic body having a portion of its surface coated with a molybdenum glaze substantially unaffected at higher temperatures by a reducing atmosphere, the said molybdenum glaze being a fired mixture of a major portion of finely-divided molybdenum and a minor portion of glaze consisting essentially, by weight, of about 36 parts feldspar, 30 parts flint, 15 parts whiting, 13 parts clay, and 5 parts chromium oxide; and a metal body soldered to the coated surface of said ceramic body.

5. In combination, a ceramic body having a metallic glazed surface coating consisting of a major portion of finely-divided tungsten particles embedded in a minor portion of fired glaze consisting, by weight, of about 36 parts feldspar, 30 parts flint, 15 parts whiting, 13 parts clay, and 5 parts chromium oxide; and a metal body joined to the glazed surface of said ceramic body by means of solder.

6. A metal coated ceramic body adapted to be joined to a metal body by solder, the metal coating on said ceramic body consisting of a fired mixture of a major portion, by weight, of a finely-divided refractory metal and a minor portion of a glaze which will not blister when heated to softening temperatures in a reducing atmosphere and which consists essentially, by weight, of about 36 parts feldspar, 30 parts flint, 15 parts whiting, 13 parts clay, and 5 parts chromium oxide.

JAMES W. UNDERWOOD.